United States Patent
Lin et al.

(10) Patent No.: US 12,358,803 B2
(45) Date of Patent: Jul. 15, 2025

(54) INTEGRATED STEAM GENERATOR AND SUPERHEATER WITH PROCESS GAS IN AMMONIA SYNLOOP

(71) Applicants: Xueqian Lin, Houston, TX (US); Shiliang Zhan, Houston, TX (US)

(72) Inventors: Xueqian Lin, Houston, TX (US); Shiliang Zhan, Houston, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 715 days.

(21) Appl. No.: 17/411,413

(22) Filed: Aug. 25, 2021

(65) Prior Publication Data

US 2022/0064013 A1   Mar. 3, 2022

Related U.S. Application Data

(60) Provisional application No. 63/069,751, filed on Aug. 25, 2020.

(51) Int. Cl.
*C01C 1/04* (2006.01)
*F22B 31/00* (2006.01)
*F22G 1/14* (2006.01)

(52) U.S. Cl.
CPC .............. *C01C 1/04* (2013.01); *F22B 31/00* (2013.01); *F22G 1/14* (2013.01)

(58) Field of Classification Search
CPC ... C01C 1/04; F22B 31/00; F22B 9/12; F22G 1/14; F22G 3/001; F22G 1/02; F22G 7/12; F01K 27/02
See application file for complete search history.

(56) References Cited

U.S. PATENT DOCUMENTS

| | | | |
|---|---|---|---|
| 2,762,201 | A | 9/1956 | Sampson |
| 4,213,954 | A | 7/1980 | Pinto |
| 4,744,966 | A | 5/1988 | Grotz |
| 6,171,570 | B1 | 1/2001 | Czuppon |
| 7,892,511 | B2 | 2/2011 | Strait |

(Continued)

FOREIGN PATENT DOCUMENTS

| | | |
|---|---|---|
| EP | 0200825 A1 | 11/1986 |
| JP | 201514416 A2 | 1/2015 |

OTHER PUBLICATIONS

PCT, International Search Report and Written Opinion mailed Dec. 8, 2021 for International Application No. PCT/US2021/047473 filed Aug. 25, 2021 (15 pages).

(Continued)

*Primary Examiner* — Hoang M Nguyen
(74) *Attorney, Agent, or Firm* — Gary Machetta

(57) ABSTRACT

An integrated steam generator/steam superheater apparatus is disclosed. The disclosed apparatus can be used in a process, such as an ammonia synthesis process, to cool an ammonia converter effluent process gas and to generate superheated steam. The integrated apparatus includes a steam superheater portion wherein hot process gas is used to generate superheated steam by heat transfer to saturated steam. The apparatus also includes a steam generator portion wherein the process gas is used to generate saturated steam by heat transfer to water. Both the superheater and the steam generator are integrated into a single unit, without intervening pluming, etc., thereby saving space and equipment.

20 Claims, 3 Drawing Sheets

(56) References Cited

U.S. PATENT DOCUMENTS

| | | | |
|---|---|---|---|
| 8,261,700 B2* | 9/2012 | Stahl | C01B 3/48 |
| | | | 165/161 |
| 9,739,478 B2 | 8/2017 | Rancruel et al. | |
| 10,618,818 B1 | 4/2020 | Sirdeshpande | |
| 2008/0190382 A1* | 8/2008 | Bruckner | F22B 1/1815 |
| | | | 122/488 |
| 2011/0206594 A1* | 8/2011 | Singh | C01C 1/0476 |
| | | | 423/361 |
| 2013/0186089 A1* | 7/2013 | Bruckner | F03G 6/067 |
| | | | 60/641.11 |
| 2014/0123914 A1* | 5/2014 | Stark | F22D 1/12 |
| | | | 122/420 |
| 2019/0072006 A1* | 3/2019 | Duffy | F01K 23/101 |
| 2019/0389724 A1 | 12/2019 | Johanning et al. | |
| 2020/0200047 A1 | 6/2020 | Romagnoli et al. | |
| 2020/0386121 A1* | 12/2020 | Meyer | F01K 13/003 |

OTHER PUBLICATIONS

Extended European Search Report and Opinion for European application No. 21862623.3; 8 pages.

* cited by examiner

INTEGRATED STEAM GENERATOR AND SUPERHEATER WITH PROCESS GAS IN AMMONIA SYNLOOP

CROSS REFERENCE TO RELATED APPLICATIONS

The present application claims priority to U.S. Provisional Patent Application Ser. No. 63/069,751, filed Aug. 25, 2020, the contents of which are incorporated herein by reference.

FIELD OF THE INVENTION

This application relates to heat recovery and steam generation in an ammonia plant, and more specifically to an integrated steam generator/steam superheater.

INTRODUCTION

Ammonia is produced by reacting nitrogen ($N_2$) with hydrogen ($H_2$) in a highly exothermic catalytic reaction. The hydrogen is provided to the reaction as a component of synthesis gas (a.k.a. syngas), which is a mixture of primarily hydrogen and nitrogen. The hot reaction effluent from the ammonia synthesis reaction, referred to herein as process gas, comprises ammonia and unreacted syngas. The process gas is cooled in stages. The first stages may involve cooling the process gas by exposing the process gas to superheated steam, generated steam, and/or boiler feed water (BFW). These heat exchange stages serve both to cool the process gas and to recover valuable heat from the system, for example, by generating and/or superheating steam, which can be used within the plant, for example, for driving steam turbines, compressors, pumps and the like. The process gas can be further cooled by heat exchange in reactor feed preheat units, followed by additional water cooling, chilling against refrigerant to temperatures on the order of −33° C., which allows the ammonia in the process gas to be condensed and recovered. The unreacted syngas components recovered at various stages throughout the process may be recycled to the ammonia reactor, allowing a continuous process loop.

To recover the maximum value of the heat generated by the exothermic reaction, it is desirable to generate superheated, medium pressure steam from the heat exchange process. Superheated steam is advantageous because it has a greater capacity to do work (i.e., it generates more power) and is less likely to condense in the transfer pipes. Thus, there is a need for heat recovery systems for generating superheated steam.

SUMMARY

Disclosed herein is an integrated steam generator/steam superheater apparatus comprising: a steam superheater section integrated with a steam generator section, wherein: the steam superheater section comprises a superheater chamber containing a first one or more heat exchange tubes and configured so that process gas within the superheater chamber superheats steam contained within the first one or more heat exchange tubes and then passes into the steam generator section, wherein the steam generator section comprises a steam generator chamber containing a tube bank comprising a plurality of second heat exchange tubes and configured so that process gas from the steam superheater section passes into the plurality of second heat exchange tubes and generates steam by transferring heat to water contained within the steam generator chamber, and wherein the apparatus is configured so that steam generated in the steam generator section is provided to the first one or more heat exchange tubes of the steam superheater section via an intervening steam drum. According to some embodiments, the tube bank comprises at least one hundred second heat exchange tubes. According to some embodiments, the apparatus further comprises a first manifold connecting the steam superheater section and the steam generator section. According to some embodiments, the apparatus further comprises a header and configured so that process gas contained within the plurality of second heat exchange tubes passes to the header via a second manifold. According to some embodiments, the steam drum is configured to accept boiler feed water (BFW) via a first inlet and to supply the BFW to the steam generator chamber via one or more down-comers. According to some embodiments, the steam drum is configured to receive steam generated in the steam generator chamber via one or more risers.

Also disclosed herein is a method of generating superheated steam using an integrated steam generator/steam superheater apparatus comprising a steam superheater section integrated with a steam generator section, wherein the steam superheater section comprises a superheater chamber containing a first one or more heat exchange tubes, and wherein the steam generator section comprises a steam generator chamber containing a tube bank comprising a plurality of second heat exchange tubes, the method comprising: receiving a process gas within the superheater chamber and allowing the process gas to superheat steam contained within the first one or more heat exchange tubes, obtaining the superheated steam from the one or more heat exchange tubes, passing the process gas from the superheater chamber into the plurality of second heat exchange tubes and allowing the process gas to generate steam in the steam generator chamber from boiler feed water (BFW) contained within the steam generator chamber, and providing the steam generated within the steam generator chamber to the first one or more heat exchange tubes via an intervening steam drum. According to some embodiments, the process gas is an effluent of an ammonia synthesis reaction. According to some embodiments, the process gas comprises nitrogen, hydrogen, carbon monoxide, and ammonia. According to some embodiments, the process gas is received within the superheater chamber has an initial temperature of 427 to 482° C. According to some embodiments, the superheated steam has a temperature of 320 to 400° C. According to some embodiments, the steam provided to the first one or more heat exchange tubes via an intervening steam drum has a temperature of 250 to 260° C. According to some embodiments, the method further comprises passing the process gas from the plurality of second heat exchange tubes to a header and obtaining the process gas from the header. According to some embodiments, the process gas obtained from the header has a temperature of 370 to 300° C. According to some embodiments, the method further comprises providing BFW to the intervening steam drum. According to some embodiments, the BFW provided to the intervening steam drum has a temperature of 200 to 226° C. According to some embodiments, the method further comprises providing BFW from the intervening steam drum to the steam generator chamber.

Also disclosed herein is a method of generating ammonia, the method comprising: reacting synthesis gas with nitrogen to produce an effluent process gas comprising ammonia and unreacted synthesis gas, using an integrated steam generator/steam superheater apparatus to cool the process gas and to generate superheated steam, further cooling the cooled process gas, and isolating ammonia from the further cooled process gas, wherein the integrated steam generator/steam superheater apparatus comprises a steam superheater section integrated with a steam generator section, wherein the steam superheater section comprises a superheater chamber containing a first one or more heat exchange tubes, and wherein the steam generator section comprises a steam generator chamber containing a tube bank comprising a plurality of second heat exchange tubes, and wherein using the integrated steam generator/steam superheater apparatus to cool the process gas and to generate superheated steam, comprises: receiving a process gas within the superheater chamber and allowing the process gas to superheat steam contained within the first one or more heat exchange tubes, obtaining the superheated steam from the one or more heat exchange tubes, passing the process gas from the superheater chamber into the plurality of second heat exchange tubes and allowing the process gas to generate steam in the steam generator chamber from boiler feed water (BFW) contained within the steam generator chamber, and providing the steam generated within the steam generator chamber to the first one or more heat exchange tubes via an intervening steam drum. According to some embodiments, the process gas is received within the superheater chamber has an initial temperature of 427 to 482° C. According to some embodiments, the superheated steam has a temperature of 320 to 400° C.

DETAILED DESCRIPTION

As mentioned above, effluent process gas from an ammonia reactor, which is a mixture of ammonia and syngas, must be cooled in various cooling stages to ultimately allow ammonia product to be condensed and recovered and to allow syngas to be recycled to the ammonia reactor. It is desirable to recover the heat from the heat exchange process in the form of steam, which can be used to do work in the ammonia plant. It is especially desirable to use the heat to generate superheated steam, because of its higher energy content.

Figure 1:
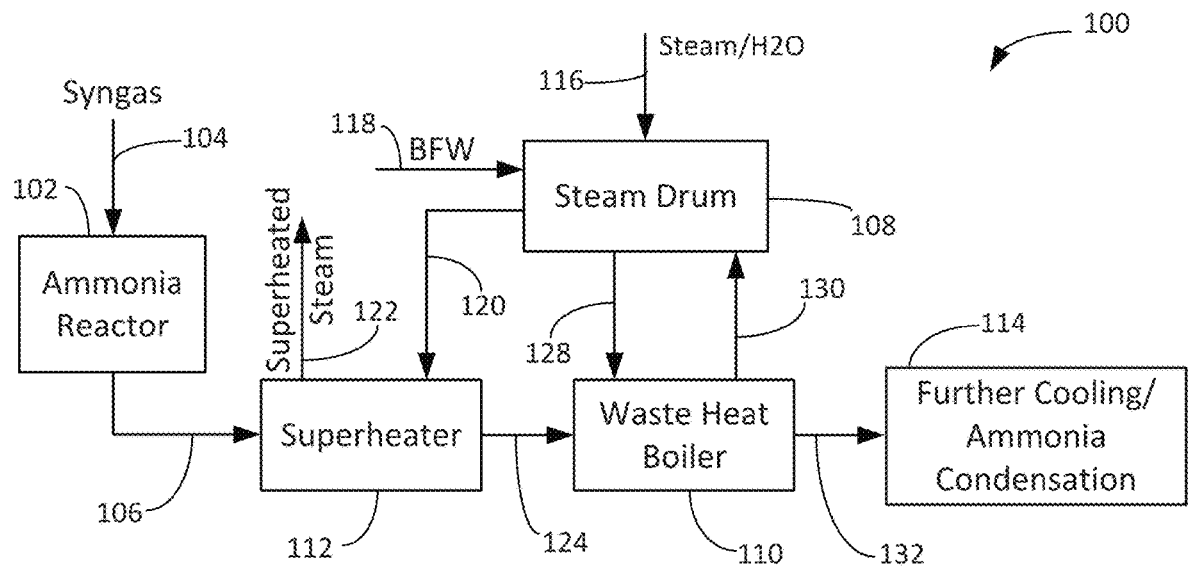
FIG. 1 shows an ammonia synthesis workflow in accordance with the prior art.

FIG. 1 shows an example of a prior art system 100 for generating superheated steam in a heat recovery system within the context of an ammonia plant. Syngas from a reforming section of the plant (not shown) is provided to an ammonia reactor 102 via line 104. Process gas comprising ammonia and unreacted syngas exits the ammonia reactor via line 106. The relevant heat recovery components include a steam drum 108, a waste heat boiler 110, and a superheater 112, which cool the process gas and generate steam before the process gas is sent for further cooling and ammonia condensation using equipment collectively denoted 114. The steam drum 108 is configured to receive steam and/or water via line 116, which steam and/or water may be generated by other waste heat boilers in the plant, such as from the reforming section of the plant (not shown). The steam drum 108 is also configured to receive boiler feed water (BFW) via line 118. The steam drum 108 provides steam to the superheater 112 via line 120. The steam in line 120 may have a temperature of about 323° C., for example. The process gas in line 106 may have a temperature of about 440° C. or above, for example. The process gas heats the steam in the superheater by heat exchange, generating superheated steam with a temperature of about 375° C., which exits the superheater via line 122. The process gas is cooled in the superheater to a temperature of about 380° C. and exits the superheater via line 124. The process gas is provided to the waste heat boiler 110 via line 124. Steam and/or hot water is provided to the waste heat boiler 110 from the steam drum 108 via line 128. The process gas transfers more of its heat in the waste heat boiler, generating steam that is returned to the steam drum 108 via line 130, and further cooling the process gas. The cooled process gas is withdrawn from the waste heat boiler via line 132 and sent for further cooling and processing by equipment 114.

The prior art system 100 for generating superheated steam illustrated in FIG. 1 requires three separate pieces of equipment, i.e., the steam drum, the waste heat boiler, and the superheater. Each of those separate components must be associated with support equipment and plumbing. That all of that equipment necessitates space within the ammonia plant and is associated with equipment costs.

Figure 2:
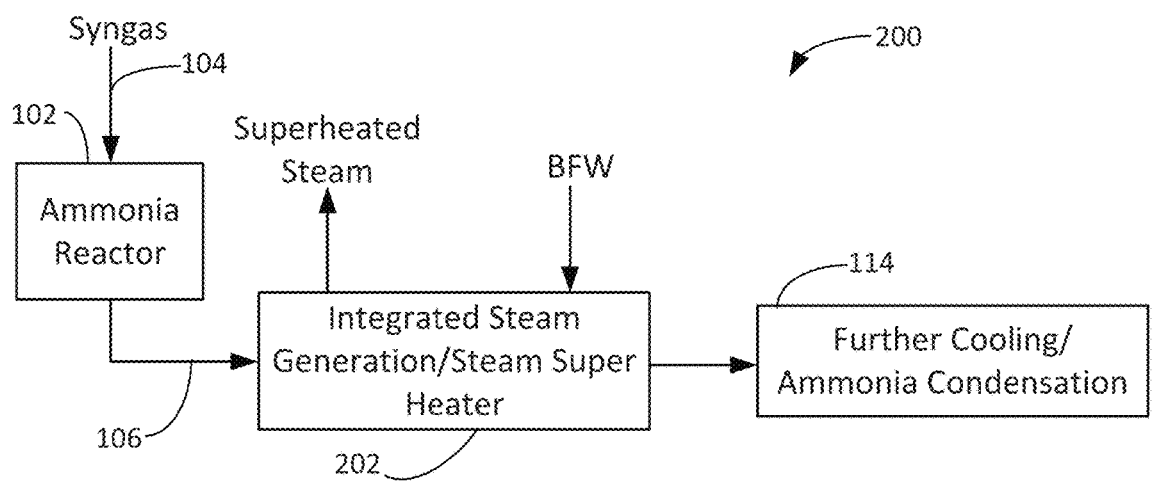
FIG. 2 shows an ammonia synthesis workflow using an integrated steam generator/superheater.

The instant disclosure provides an integrated steam generator/superheater that overcomes some of the drawbacks of the prior art systems, such as the costs and space requirements associated with accommodating separate components. FIG. 2 illustrates an embodiment of an integrated system 200 for producing superheated steam in the context of an ammonia synthesis plant. The plant includes an ammonia reactor 102, a syngas feed stream 104, and a process gas effluent stream 106, each as described above. According to some embodiments, the process gas effluent stream 106 may have a temperature of about 427° C. to about 482° C. The process gas effluent stream is provided to an integrated steam generator/superheater 202. The steam generator/superheater 202 is configured generate saturated steam via heat exchange between the process gas and BFW. Further heat exchange between the process gas and the saturated steam within the integrated steam generator/superheater 202 yields superheated steam. The cooled process gas is then routed to further cooling equipment and ammonia condensation equipment 114, as described above. By combining the steam generation and the steam superheating equipment into a single apparatus, the integrated system 202 saves space and equipment.

Figure 3:
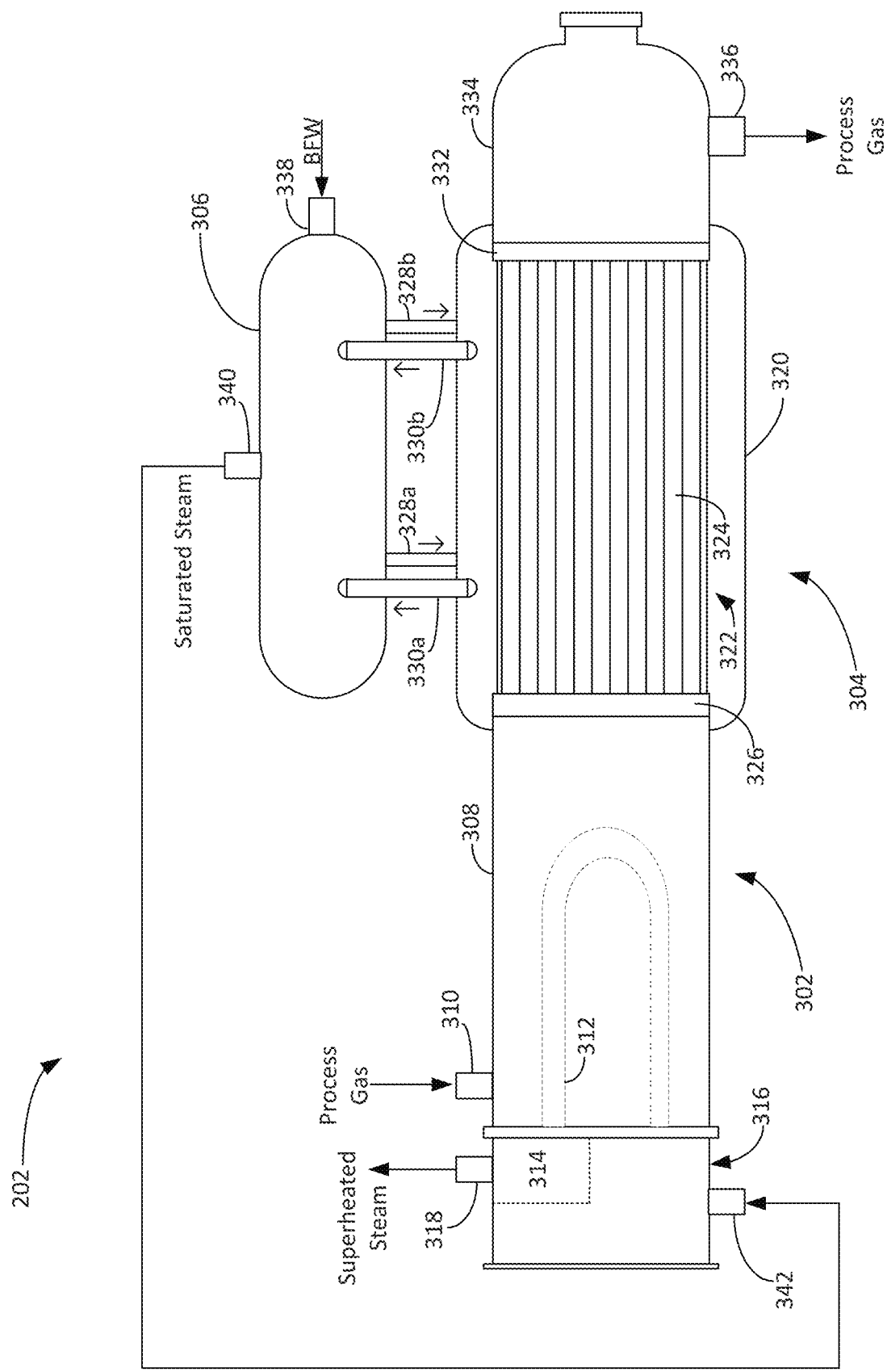
FIG. 3 shows an embodiment of an integrated steam generator/superheater.

FIG. 3 illustrates an embodiment of an integrated steam generator/superheater 202. The integrated steam generator/superheater 202 comprises a superheater portion 302, a steam generator portion 304, and an integrated steam drum 306. According to some embodiments, the superheater portion 302 and the steam generator portion 304 are joined as a single, integrated body. The superheater portion 302 comprises a superheater chamber 308. Hot process gas (containing ammonia and syngas) from the ammonia reactor enters the superheater chamber 308 via a process gas inlet 310. The entering process gas is at a high temperature, for example, about 427 to about 482° C. The superheater chamber contains one or more superheater heat exchange tubes 312, which are configured to contain saturated steam (provided by the steam generator section, as explained further below). The saturated steam enters the apparatus via a saturated steam inlet 342, whereby the steam is provided to a saturated steam section of a divided chamber 316. The saturated steam in the divided chamber can enter the superheater exchange tube(s) 312. The hot process gas exchanges heat with the saturated steam in the superheater heat exchange tube(s) 312, thereby superheating the saturated steam. The superheated steam exits the heat exchange tube(s) 312 into a superheated steam section 314 of a divided chamber 316 and then exits the apparatus via a superheated steam outlet 318. According to some embodiments, the superheated steam may have a temperature of about 320 to about 400° C.

Figure 4:
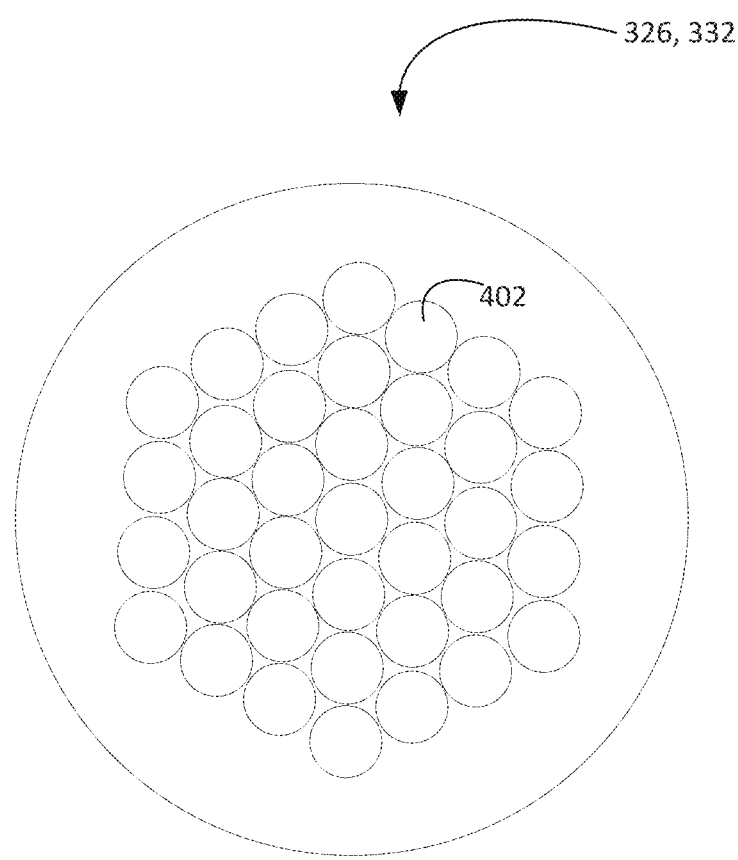
FIG. 4 shows a manifold.

The hot process gas within the superheater chamber 308, having lost some of its heat by heat exchange with the steam within the superheater heat exchange tube(s) 312, then enters the steam generator portion 304 of the apparatus 202. The steam generator portion 304 comprises a steam generator chamber 320, which contains a tube bank 322 comprising a plurality of tubes 324. According to some embodiments, the plurality of tubes 322 may comprise hundreds of tubes 324 and the tubes may be about one inch in diameter, for example. The process gas enters the tubes 324 via a first manifold 326. The process gas within the plurality of tubes 322 (i.e., tube side) exchanges heat with water and/or steam contained within the chamber 320 (i.e., shell side), generating saturated steam in the chamber 320. The water/steam is supplied to the steam generator chamber 320 from the steam drum 306 via down-corners 328a and 328b. Thus, the process gas contained within the plurality of tubes 322 is further cooled via the heat exchange. The steam generated within the steam generator chamber 320 is routed to the steam drum 306 via risers 330a and 330b. The process gas within the tubes 324 exits the steam generator chamber 320 via a second manifold 332 into a header 334. The process gas exits the header 334 via a process gas outlet 336 and may be sent for further cooling and ammonia isolation as described above. According to some embodiments, the process gas exiting the system via the process gas outlet 336 has a temperature of about 370 to about 300° C. An example of a manifold, such as the first and second manifolds 326 and 332 is illustrated in FIG. 4. The manifold comprises a plurality of holes 402, each configured to connect to one of the tubes 324 (FIG. 3).

Referring again to FIG. 3, the steam drum 306 is configured to receive, via risers 330a and 330b, the saturated steam generated within the within the steam generator chamber 320. The steam drum is also configured to receive BFW via a BFW inlet 338. According to some embodiments, the BFW may have a temperature of about 200 to about 226° C. From the steam drum, the BFW is provided to the steam generator chamber 320 via the down-corners 328a and 328b. A portion of the saturated steam within the steam drum exits the steam drum via a saturated steam outlet 340 and is circulated to the divided chamber 316. The saturated steam enters the divided chamber 316 via a saturated steam inlet 342. According to some embodiments, the saturated steam has a temperature of about 250 to about 260° C. From the divided chamber the saturated steam enters the superheater heat exchange tube(s) 312 where it is superheated as described above.

It will be apparent to a person of skill in the art that the integrated steam generator/superheater 202 described above provides several advantages over the prior art systems, such as illustrated in FIG. 1. The steam generator portion 304 and the steam superheater portion 302 are integrated into a single piece of equipment, i.e., they are directly connected to each other without intervening piping or support equipment. As shown above, the superheater and steam generator portions are directly connected via a manifold. Thus, the footprint of the integrated system is less than systems having separate steam generators and superheaters. Likewise, the steam drum 306 is integrated with the steam generator portion.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. As used herein, the term "about" typically refers to plus or minus a ten percent variance. Thus, the present invention is intended to cover alternatives, modifications, and equivalents that may fall within the spirit and scope of the present invention as defined by the claims.

What is claimed is:

1. An integrated steam generator/steam superheater apparatus comprising:
a steam superheater section integrated with a steam generator section, wherein:
the steam superheater section comprises a superheater chamber containing a first one or more heat exchange tubes and configured so that process gas within the superheater chamber superheats steam contained within the first one or more heat exchange tubes and then passes into the steam generator section, wherein
the steam generator section comprises a steam generator chamber containing a tube bank comprising a plurality of second heat exchange tubes and configured so that process gas from the steam superheater section passes into the plurality of second heat exchange tubes and generates steam by transferring heat to water contained within the steam generator chamber, and wherein
the apparatus is configured so that steam generated in the steam generator section is provided to the first one or more heat exchange tubes of the steam superheater section via an intervening steam drum.

2. The apparatus of claim 1, wherein the tube bank comprises at least one hundred second heat exchange tubes.

3. The apparatus of claim 1, further comprising a first manifold connecting the steam superheater section and the steam generator section.

4. The apparatus of claim 1, further comprising a header and configured so that process gas contained within the plurality of second heat exchange tubes passes to the header via a second manifold.

5. The apparatus of claim 1, wherein the steam drum is configured to accept boiler feed water (BFW) via a first inlet and to supply the BFW to the steam generator chamber via one or more down-comers.

6. The apparatus of claim 1, wherein the steam drum is configured to receive steam generated in the steam generator chamber via one or more risers.

7. A method of generating superheated steam using an integrated steam generator/steam superheater apparatus comprising a steam superheater section integrated with a steam generator section, wherein
the steam superheater section comprises a superheater chamber containing a first one or more heat exchange tubes, and wherein
the steam generator section comprises a steam generator chamber containing a tube bank comprising a plurality of second heat exchange tubes, the method comprising:
receiving a process gas within the superheater chamber and allowing the process gas to superheat steam contained within the first one or more heat exchange tubes,
obtaining the superheated steam from the one or more heat exchange tubes,
passing the process gas from the superheater chamber into the plurality of second heat exchange tubes and allowing the process gas to generate steam in the steam generator chamber from boiler feed water (BFW) contained within the steam generator chamber, and providing the steam generated within the steam generator chamber to the first one or more heat exchange tubes via an intervening steam drum.

8. The method of claim 7, wherein the process gas is an effluent of an ammonia synthesis reaction.

9. The method of claim 8, wherein the process gas comprises nitrogen, hydrogen, carbon monoxide, and ammonia.

10. The method of claim 7, wherein the process gas is received within the superheater chamber has an initial temperature of 427 to 482° C.

11. The method of claim 7, wherein the superheated steam has a temperature of 320 to 400° C.

12. The method of claim 7, wherein the steam provided to the first one or more heat exchange tubes via an intervening steam drum has a temperature of 250 to 260° C.

13. The method of claim 7, further comprising passing the process gas from the plurality of second heat exchange tubes to a header and obtaining the process gas from the header.

14. The method of claim 13, wherein the process gas obtained from the header has a temperature of 370 to 300° C.

15. The method of claim 7, further comprising providing BFW to the intervening steam drum.

16. The method of claim 15, wherein the BFW provided to the intervening steam drum has a temperature of 200 to 226° C.

17. The method of claim 7, further comprising providing BFW from the intervening steam drum to the steam generator chamber.

18. A method of generating ammonia, the method comprising:

reacting synthesis gas with nitrogen to produce an effluent process gas comprising ammonia and unreacted synthesis gas, using an integrated steam generator/steam superheater apparatus to cool the process gas and to generate superheated steam, further cooling the cooled process gas, and isolating ammonia from the further cooled process gas, wherein the integrated steam generator/steam superheater apparatus comprises a steam superheater section integrated with a steam generator section, wherein the steam superheater section comprises a superheater chamber containing a first one or more heat exchange tubes, and wherein the steam generator section comprises a steam generator chamber containing a tube bank comprising a plurality of second heat exchange tubes, and wherein using the integrated steam generator/steam superheater apparatus to cool the process gas and to generate superheated steam, comprises:

receiving a process gas within the superheater chamber and allowing the process gas to superheat steam contained within the first one or more heat exchange tubes, obtaining the superheated steam from the one or more heat exchange tubes, passing the process gas from the superheater chamber into the plurality of second heat exchange tubes and allowing the process gas to generate steam in the steam generator chamber from boiler feed water (BFW) contained within the steam generator chamber, and providing the steam generated within the steam generator chamber to the first one or more heat exchange tubes via an intervening steam drum.

19. The method of claim 18, wherein the process gas is received within the superheater chamber has an initial temperature of 427 to 482° C.

20. The method of claim 18, wherein the superheated steam has a temperature of 320 to 400° C.

* * * * *